US010810084B2

(12) United States Patent
Jepson et al.

(10) Patent No.: US 10,810,084 B2
(45) Date of Patent: Oct. 20, 2020

(54) UPDATE FAILURE REBOOTING AND RECOVERY FOR A SMART DEVICE

(71) Applicant: Intel Corporation, Santa Clara, CA (US)

(72) Inventors: Daniel Jepson, San Jose, CA (US); Charles Carter Jernigan, Santa Clara, CA (US); Nicholas Moe Khosravy, Palo Alto, CA (US); John Wei, Saratoga, CA (US); Fai Yeung, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 878 days.

(21) Appl. No.: 15/088,627

(22) Filed: Apr. 1, 2016

(65) Prior Publication Data
US 2017/0286091 A1    Oct. 5, 2017

(51) Int. Cl.
*G06F 11/00* (2006.01)
*G06F 11/14* (2006.01)
*G06F 9/4401* (2018.01)
*G06F 8/654* (2018.01)

(52) U.S. Cl.
CPC .......... *G06F 11/1438* (2013.01); *G06F 8/654* (2018.02); *G06F 9/4406* (2013.01); *G06F 9/4408* (2013.01); *G06F 11/1433* (2013.01)

(58) Field of Classification Search
CPC .................................. G06F 8/65; G06F 8/654
See application file for complete search history.

(56) References Cited

U.S. PATENT DOCUMENTS

| 6,311,291 | B1* | 10/2001 | Barrett, Sr. | H04L 43/50 |
| | | | | 379/222 |
| 6,643,506 | B1* | 11/2003 | Criss | G06F 8/65 |
| | | | | 455/418 |
| 7,555,640 | B2* | 6/2009 | Helvick | G06F 8/65 |
| | | | | 713/1 |
| 7,698,698 | B2* | 4/2010 | Skan | G06F 11/1433 |
| | | | | 717/168 |
| 8,555,273 | B1* | 10/2013 | Chia | G06F 8/654 |
| | | | | 717/173 |
| 9,557,981 | B2* | 1/2017 | Throop | G06F 8/654 |
| 10,269,452 | B2* | 4/2019 | Volpe | A61N 1/3968 |

(Continued)

OTHER PUBLICATIONS

PCMAG, system image, p. 1 (Year: 2013).*
Techopedia, smart device, p. 1-2 (Year: 2019).*

*Primary Examiner* — Jonathan D Gibson
(74) *Attorney, Agent, or Firm* — Patent Capital Group

(57) ABSTRACT

One embodiment relates to an apparatus, comprising logic, at least partially incorporated into hardware, to receive, by a primary communication device, an update image associated with a smart device, and initiate sending of the update image to the smart device, wherein a bootloader of the smart device is configured to update a memory of the smart device with the update image. The logic is further to determine whether the updating of the memory of the smart device with the update image has been interrupted, and responsive to determining that the updating of the memory of the smart device with the update image has been interrupted, send a first message to the smart device to instruct the bootloader of the smart device to resume updating of the memory of the smart device.

21 Claims, 6 Drawing Sheets

(56) References Cited

U.S. PATENT DOCUMENTS

| | | | | |
|---|---|---|---|---|
| 2001/0039631 | A1* | 11/2001 | Barrett, Sr. | H04L 43/50 |
| | | | | 714/4.5 |
| 2006/0073820 | A1* | 4/2006 | Craswell | G06F 8/65 |
| | | | | 455/419 |
| 2006/0075284 | A1* | 4/2006 | Skan | G06F 8/63 |
| | | | | 714/5.1 |
| 2007/0027506 | A1* | 2/2007 | Stender | G16H 40/40 |
| | | | | 607/60 |
| 2007/0093243 | A1* | 4/2007 | Kapadekar | H04M 3/42178 |
| | | | | 455/419 |
| 2007/0214344 | A1* | 9/2007 | Helvick | G06F 8/65 |
| | | | | 713/1 |
| 2007/0255114 | A1* | 11/2007 | Ackermann | G06F 8/65 |
| | | | | 600/300 |
| 2008/0189340 | A1* | 8/2008 | Blea | G06F 16/9017 |
| 2008/0301665 | A1* | 12/2008 | Charlton | A61B 5/14532 |
| | | | | 717/170 |
| 2009/0017812 | A1* | 1/2009 | Chan | G06F 8/62 |
| | | | | 455/419 |
| 2009/0260004 | A1* | 10/2009 | Datta | G06F 8/65 |
| | | | | 717/175 |
| 2012/0096451 | A1* | 4/2012 | Tenbarge | G06F 11/1433 |
| | | | | 717/170 |
| 2013/0185563 | A1* | 7/2013 | Djabarov | G06F 8/654 |
| | | | | 713/176 |
| 2013/0263105 | A1* | 10/2013 | Cornwell | G06F 8/654 |
| | | | | 717/168 |
| 2015/0121358 | A1* | 4/2015 | Nekoomaram | G06F 8/654 |
| | | | | 717/170 |
| 2016/0225562 | A1* | 8/2016 | Franks | H02H 3/08 |
| 2016/0253471 | A1* | 9/2016 | Volpe | G06F 9/4401 |
| | | | | 607/5 |
| 2017/0063718 | A1* | 3/2017 | Bower, III | H04L 47/00 |
| 2020/0143057 | A1* | 5/2020 | Limonciello | G06F 21/572 |

* cited by examiner

UPDATE FAILURE REBOOTING AND RECOVERY FOR A SMART DEVICE

TECHNICAL FIELD

This application relates to the field of computing, and more particularly to update failure rebooting and recovery for a smart device.

BACKGROUND

Many smart devices, due to their nature of specialized supplemental functionality for a user are often manufactured with limited memory capacity. Often, smart devices include just enough memory to store one copy of an applicable operating system or firmware. As a result, such smart devices are not able to maintain a previous version of an OS or firmware within memory or obtain a new or updated version of the OS or firmware before erasing the current version. Thus, if the update procedure is interrupted due to battery failure or power loss of either the primary communication device or smart device during an update process, connectivity interruption to a source of an update, the primary communication device and the smart device move out of range, the primary communication device reboots or crashes due to a bug, the smart device reboots or crashes due to a bug, or the update process is otherwise unable to be complete before the smart device powers up again, the smart device may fail to re-boot as a result of being stuck in a state of operating system (OS) limbo because an incomplete version of the updated firmware or OS is likely to be un-executable by the smart device. Accordingly, the smart device may be rendered inoperable due to the failed update.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

Figure 1:
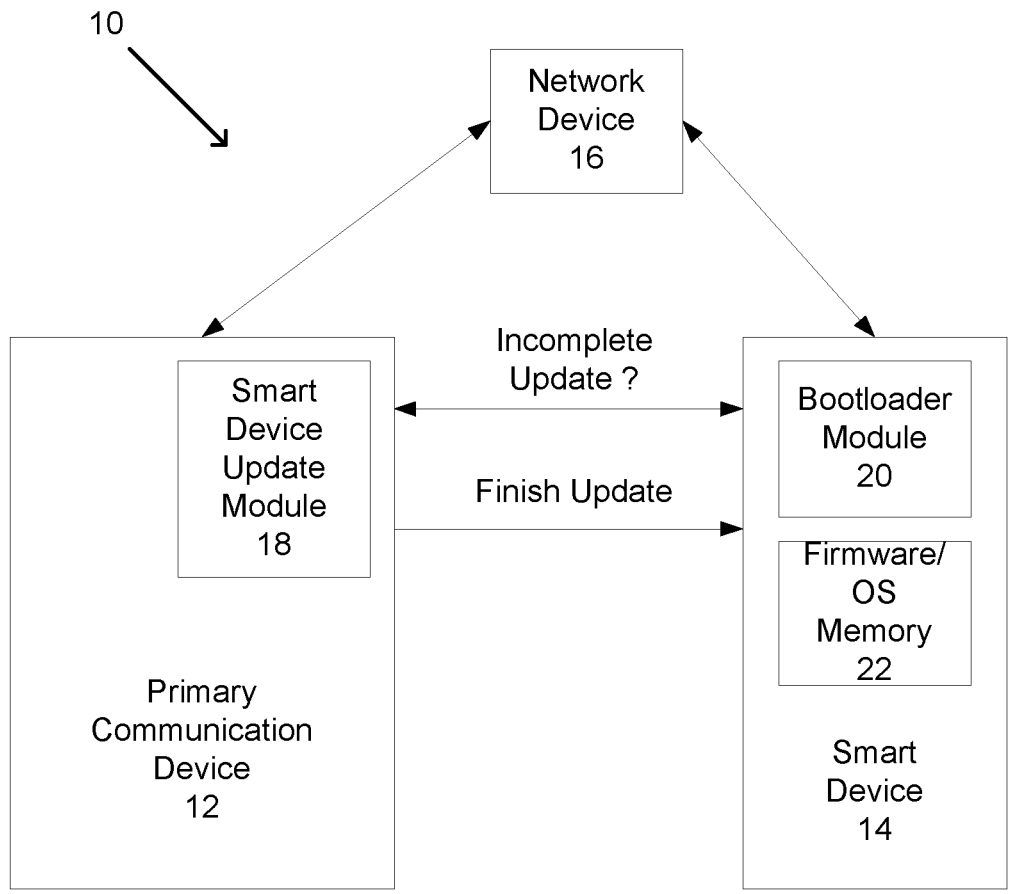
FIG. 1 illustrates an embodiment of a communication system for update failure rebooting and recovery for a smart device.

In accordance with one or more embodiments, a primary communication device, such as a smartphone, is configured to send a firmware or operating system (OS) update image to a smart device as a wireless download by the smart device. The primary communication device is further configured to detect that an update to the operating system or firmware of the smart device did not successfully complete, and instruct the smart device to finish the update procedure when conditions required for receiving the update are restored, e.g., when the connection is restored, battery power is restored, etc. In one embodiment, the primary communication device detects that the sending of the update image to the smart device did not complete by determining that the smart device has not communicated with the primary communication device within an expected time period. In another embodiment, a bootloader of the smart device cooperates with the primary communication device or a network device to inform the primary communication device or network device that sending of an update to the smart device did not complete. As a result, the primary communication device or network device can instruct the bootloader of the smart device to finish updating the firmware or operating system. As a result, the smart device enters a recovery mode and recovers the remainder of the update from the primary communication device, thus avoiding failure of the update. In one or more embodiments, the bootloader of the smart device can address the problems associated with limited memory smart devices and failure during updates. Accordingly, in one or more embodiments if the primary communication device fails to receive an expected communication from the smart device within a determined time period, the primary communication device sends a message to the smart device instructing the bootloader of smart device to resume and/or complete the update procedure by either downloading the incomplete portion of the update image or requesting a new copy of the update image. In other embodiments, the bootloader of the smart device detects a failure of the update to complete downloading and instructs the smart device to send a message to the primary communication device indicating that the update did not complete. In response to receiving the message from the smart device indicating that the update did not complete, the primary communication device sends a message to the smart device instructing the bootloader of the smart device to finish the update procedure by requesting the unfinished portion of the image update or an entirely new update image. In still other embodiments, the primary communication device may receive a message from another network device that has become aware of the interruption in the update of the smart device indicating that the updating procedure did not complete. In response to receiving the message from the other network device, the primary communication device sends a message to the smart device instructing the smart device to finish the update procedure.

FIG. 1 illustrates an embodiment of a communication system 10 for update failure rebooting and recovery for a smart device. In the particular embodiment illustrated in FIG. 1, communication system 10 includes a primary communication device 12, a smart device 14, and a network device 16. Primary communication device 12 is configured to wirelessly communicate with each of smart device 14 and network device 16. In particular embodiments, primary communication device 12 communicates with smart device 14 using a Bluetooth low energy (BLE) communication protocol such as described in the Bluetooth Core Specification Version 4.0. In particular embodiments, primary communication device 12 is a communication and/or computing device, such as a smartphone, configured to received a firmware and/or operating system (OS) update from network device 16, send the firmware/OS update to smart device 14, determine whether smart device 14 has successfully updated its firmware/OS and instruct smart device 14 to complete the updating process if it is determined that the updating process was not successful.

Primary communication device 12 includes a smart device update module 18 configured to determine whether a firmware and/or OS update of smart device 14 has been successful and send a message instructing smart device 14 to complete the update if it is determined that the update was not completed as described herein. Smart device 14 includes a bootloader module 20 and a firmware/OS memory 22. The firmware/OS memory 22 is a memory element configured to store the current firmware and/or operating system (OS) of smart device 14. In a particular embodiment, firmware/OS memory 22 includes flash memory. Bootloader module 20 is configured to receive a message from primary communication device 12 instructing bootloader module 20 of smart device 14 to resume and complete the update procedure. In other embodiments, bootloader 20 of smart device 14 detects a failure and/or interruption of the update of the firmware and/or OS to complete and instructs smart device 14 to send a message to primary communication device 12 indicating that the update did not complete and requesting the portion of the update image needed to complete the update or the entire update image. In response, primary communication device 12 sends a message to bootloader module 20 instructing bootloader module 20 to complete the update of the firmware/OS to firmware/OS memory 22.

In particular embodiments, smart device 14 includes a wireless device configured to communicate data with primary communication device 12. In particular embodiments, smart device 14 may include one or more of a smart watch, a fitness and/or activity tracker, a health monitor, a navigation device, a media playback device, a smart phone, smart jewellery, smart glasses, a head-mounted optical display, a headset, an ear-bud or any wearable device or other suitable electronic device configured to communicate data with primary communication device 12. Network device 16 is a network device configured to send an updated firmware and/or OS image intended for smart device 14 to primary communication device 12. In particular embodiments, network device 16 may include a server. Although the embodiment of FIG. 1 is illustrated using a single smart device 14 and network device 16 in communication system 10, it should be understood that in other embodiments any number of smart devices and network devices may be present.

In an example operation of communication system 10 of FIG. 1 according to one embodiment, network device 16 sends a firmware/OS update image to smart device update module 18 of primary communication device 12. Smart device update module 18 then sends the firmware/OS update image to bootloader module 20 of smart device 14. Bootloader module 20 then attempts to update firmware/OS memory 22 with the firmware/OS update image. In one embodiment, if there is a failure of the update such as due to a loss of power of smart device 14, smart device 14 may be unable to send an expected communication to primary communication device 12. As a result, smart device update module 18 may determine that the update was incomplete. In another embodiment, bootloader module 20 may detect that the update of firmware/OS memory 22 did not complete and send a message to primary communication device 12 indicating the update was incomplete. In another embodiment, smart device 14 enters a recovery mode and continuously sends a "mayday" message for primary communication device 12. In still another embodiment, network device 16 may determine that the update was incomplete by determining that an expected communication from smart device 14 to network device 16 was not received within an expect time period, and sending a message to primary communication device 12 indicating the update was incomplete.

Upon determining that the update of firmware/OS memory 22 was incomplete, smart device update module 18 may send a message to bootloader 20 to complete the update procedure. In one or more embodiments, smart device update module 18 of primary communication device 12 resends the updated firmware and/or OS image to bootloader module 20 so that bootloader module 20 will attempt to use the updated firmware and/or OS image to update firmware/OS memory 22.

Figure 2:
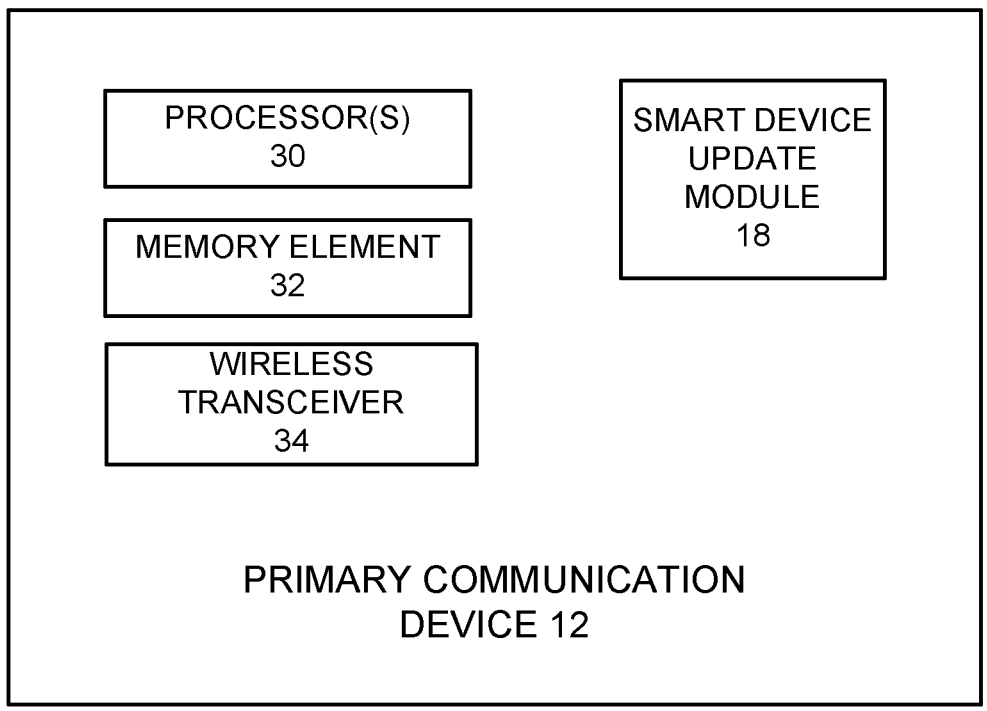
FIG. 2 illustrates an embodiment of the primary communication device of the communication system of FIG. 1.

FIG. 2 illustrates an embodiment of primary communication device 12 of the communication system 10 of FIG. 1. In the particular embodiment illustrated in FIG. 2, primary communication device 12 includes one or more processor(s) 30, a memory element 32, a wireless transceiver 34, and smart device update module 18. Processor(s) 30 is configured to execute software instructions to perform various operations of primary communication device 12 as described herein. Processor(s) 30 may be any type of processor, such as a micro-processor, an embedded processor, a digital signal processor (DSP), a network processor, or other device to execute code. Although only one processor(s) 50 is illustrated in FIG. 2, it should be understood that primary communication device 12 may include more than one processor in some embodiments. Memory element 32 may be configured to store software instructions and data associated with primary communication device 12. Memory element 32 may be any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

Wireless transceiver 34 is configured to enable wireless communication with one or more of smart device 14 and network device 16. In particular embodiments, wireless transceiver 34 may include one or more of a Bluetooth transceiver, a Wi-Fi transceiver, a 3G and/or 4G transceiver, an NFC transceiver, ultrasound, or any other suitable wireless transceiver.

Smart device update module 18 includes software and/or hardware to facilitate receiving of firmware and/or OS update images intended for smart device 14, sending the update images to smart device 14, determining whether smart device 14 has successfully updated the firmware and/or OS of smart device 14 using the image as described herein.

Figure 3:
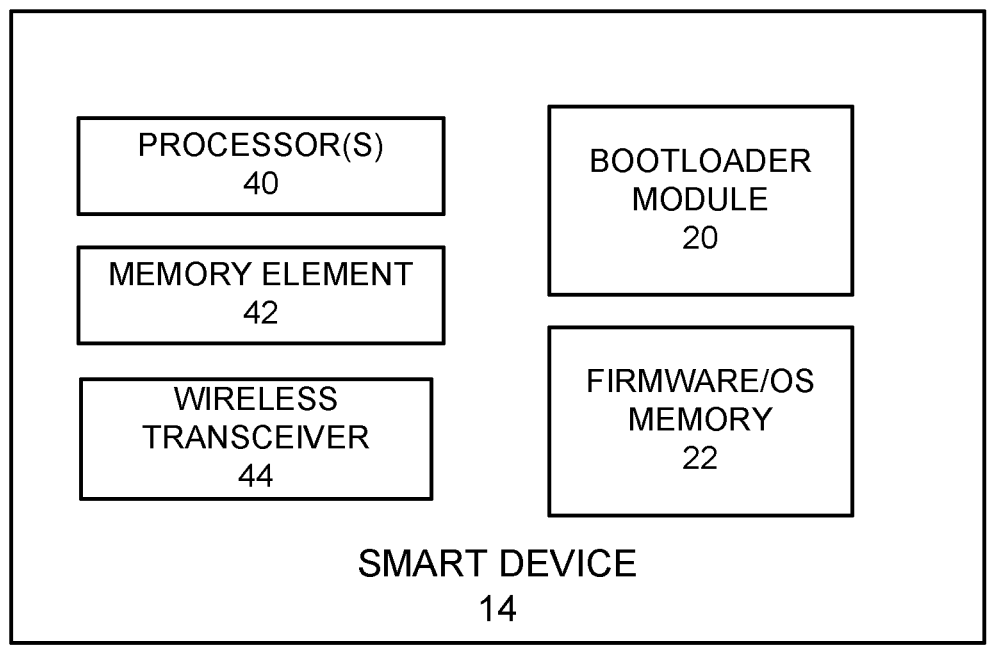
FIG. 3 illustrates an embodiment of the smart device of the communication system of FIG. 1.

FIG. 3 illustrates an embodiment of smart device 14 of the communication system 10 of FIG. 1. In the particular embodiment illustrated in FIG. 3, smart device 14 includes one or more processor(s) 40, a memory element 42, a wireless transceiver 44, bootloader module 20, and firmware/OS memory 22. Processor(s) 40 is configured to execute software instructions to perform various operations of smart device 14 as described herein. Processor(s) 40 may be any type of processor, such as a micro-processor, an embedded processor, a digital signal processor (DSP), a network processor, or other device to execute code.

Although only one processor(s) 40 is illustrated in FIG. 3, it should be understood that smart device 14 may include more than one processor in some embodiments. Memory element 42 may be configured to store software instructions and data associated with smart device 12. Memory element 42 may be any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

Wireless transceiver 44 is configured to enable wireless communication with primary communication device 12 and/or network device 16. In particular embodiments, wireless transceiver 44 may include one or more of a Bluetooth transceiver, a Wi-Fi transceiver, a 3G and/or 4G transceiver, an NFC transceiver, ultrasound, or any other suitable wireless transceiver.

Bootloader module 20 includes software and/or hardware to facilitate the updating of the firmware/OS stored within firmware/OS memory 22 of smart device 14 as described herein. In one or more embodiments, bootloader module 20 is configured to receive a firmware/OS update image from primary communication device 12, and update firmware/OS memory 22 using the update image. Bootloader 20 may be further configured to determine whether the firmware/OS update was successful, and send a message to primary communication device 12 if the update was determined to not be successful.

Figure 4:
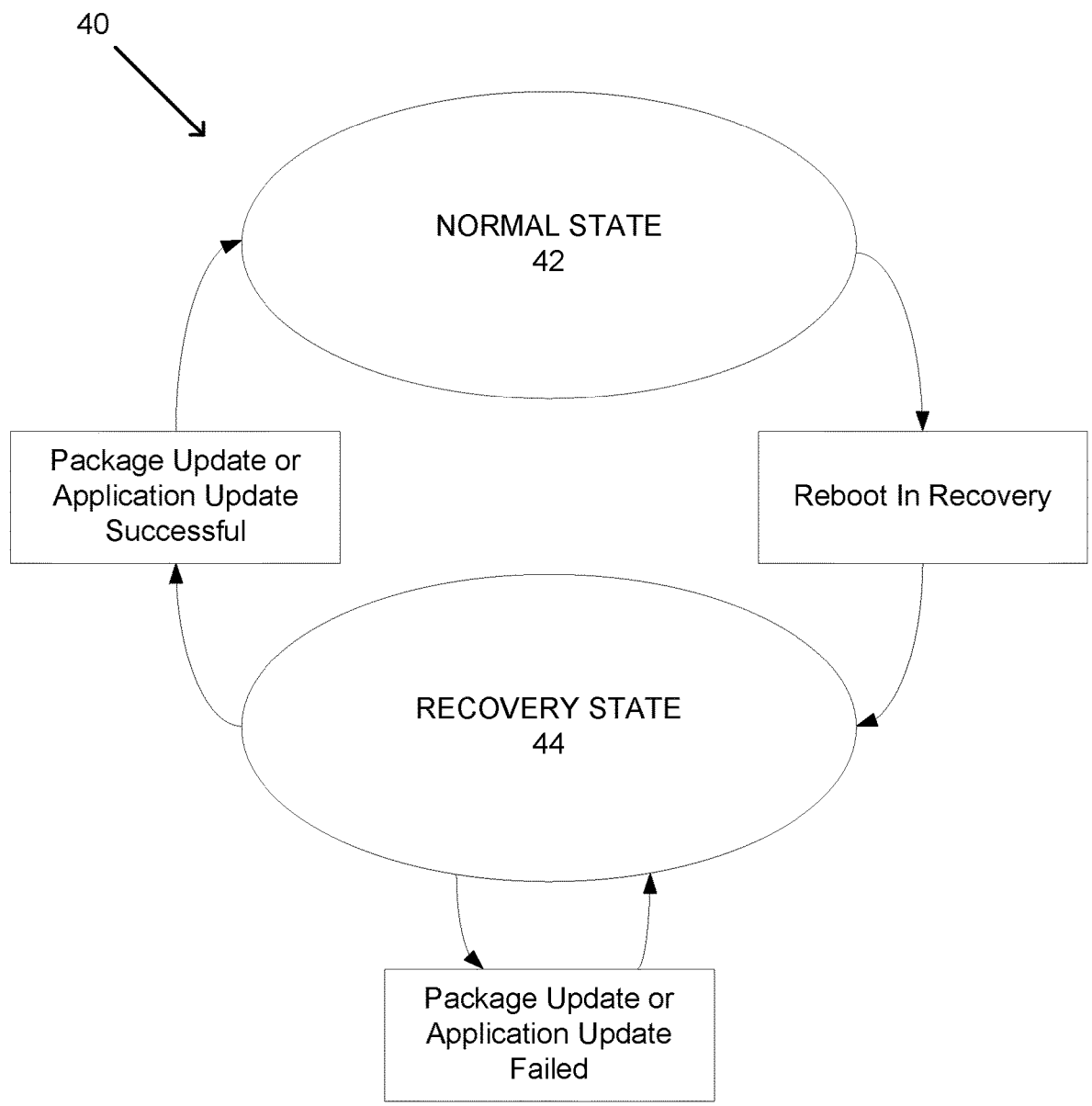
FIG. 4 illustrates a simplified state diagram showing operating states of the smart device of the communication system of FIG. 1.

FIG. 4 illustrates a simplified state diagram 40 showing operating states of smart device 14 of the communication system 10 of FIG. 1. Smart device 14 begins in a normal state 42 in which smart device 14 operates in the normal operating mode to function as smart device 14 is intended such as communicating information between smart device 14 and primary communication device 12. If smart device 14 receives an updated firmware/OS image, smart device 14 reboots into a recovery state 44. In recovery state 44, bootloader module 20 of smart device 14 attempts to update firmware/OS memory 22 using the updated firmware/OS image. In at least one embodiment, the firmware/OS update image is in a firmware over-the-air (FOTA) application image binary format. In other embodiments, the firmware/OS update image is in a FOTA package image binary format. If the package update or application update has failed, smart device 14 remains in recovery state 44 so that updating of the firmware/OS can be attempted again. If the package update or application update is successful, smart device 14 returns to normal state 42.

Figure 5A:
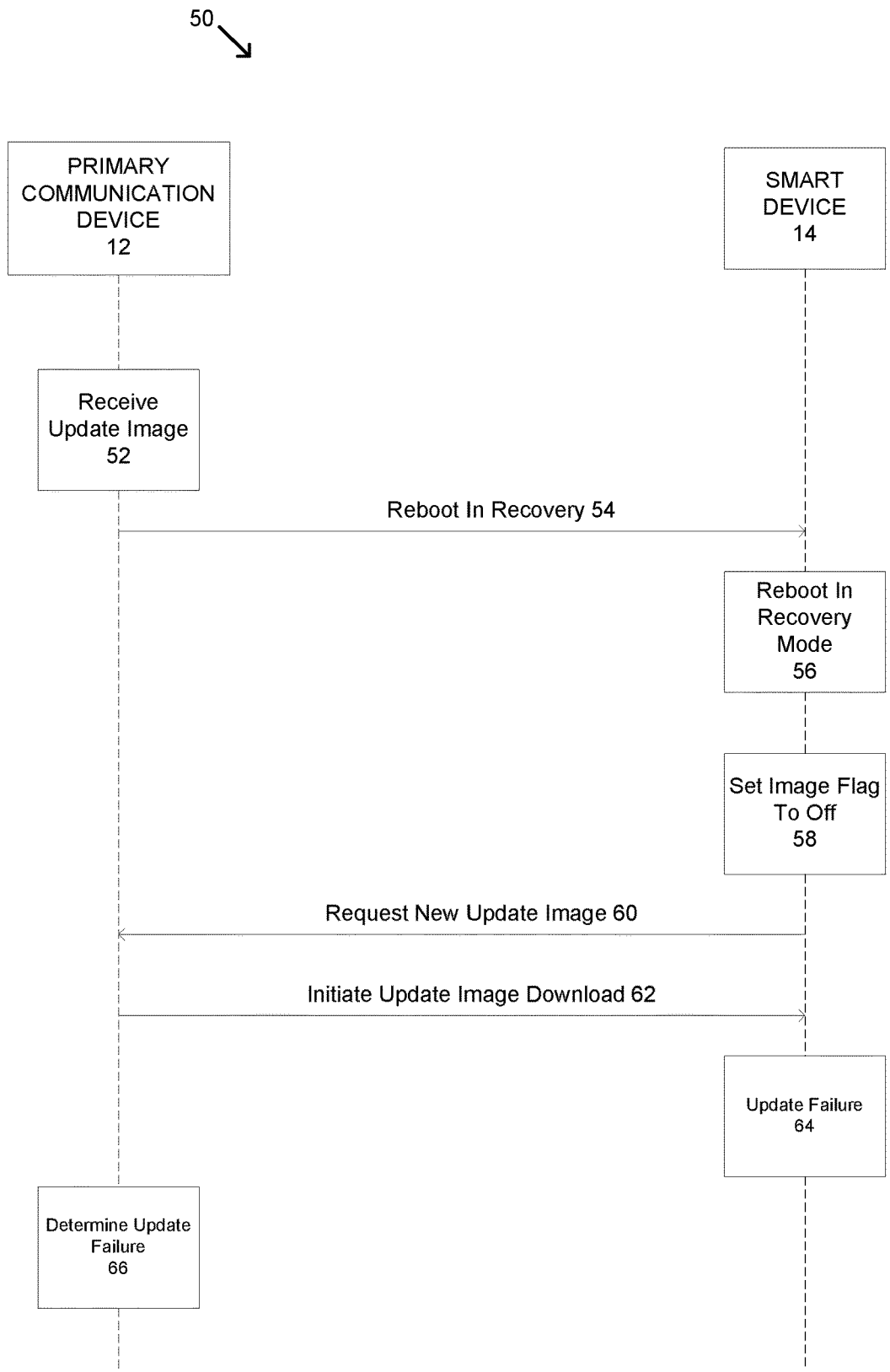
FIGS. 5A-5B illustrate a simplified flow diagram showing flows associated with the communication system of FIG. 1 in accordance with one embodiment.
Figure 5B:
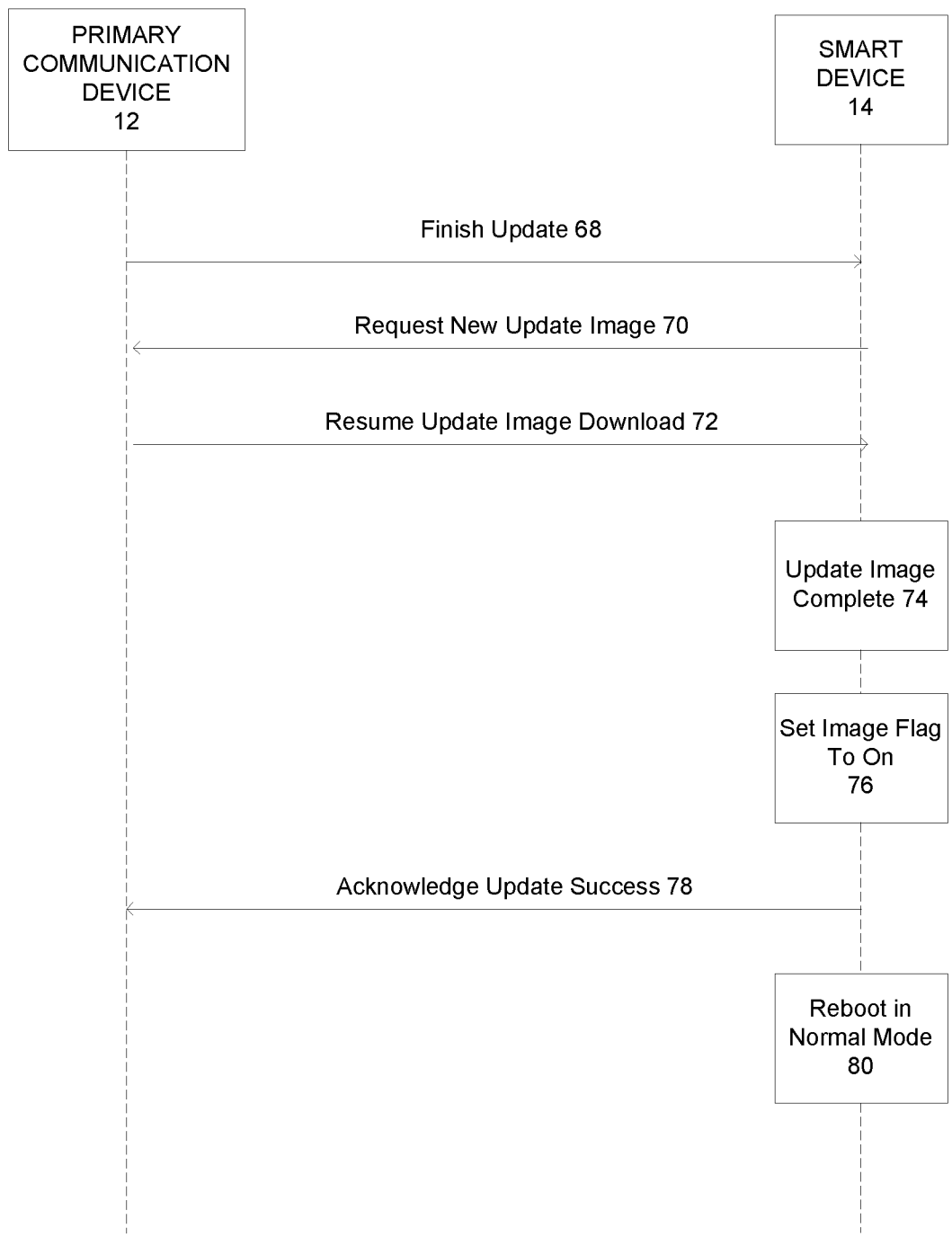

FIGS. 5A-5B illustrate a simplified flow diagram 50 showing flows associated with the communication system of FIG. 1 in accordance with one embodiment. In 52, primary communication device 12 receives a firmware/OS update image for smart device 14. In 54, primary communication device 12 sends a message indicating for smart device 14 to enter recovery mode. In 56, smart device 14 enters recovery mode. In 58, smart device 14 sets an image flag to off indicating that the current firmware/OS image is invalid. In 60, smart device 14 sends a request for the new update image to primary communication device 12. In 62, primary communication device 12 initiates downloading of the new update image to smart device 14. In 64, a failure of the update of the firmware/OS image occurs. In a particular embodiment, the failure may be due to one or more of a loss of connection, a battery failure, or any other event that causes the downloading of the update image to fail.

In 66, primary communication device 12 determines that the firmware/OS update of smart device 14 has failed and/or has been interrupted. In a particular embodiment, primary communication device 12 determines that the firmware/OS update has failed because primary communication device 12 has not received an expected communication from smart device 14 within a predetermined time period. In another particular embodiment, smart device 14 may determine on its own that the update has failed and send a message indicative of the failure of the update to primary communication device 12. In still another particular embodiment, network device 16 may detect that the update of the firmware/OS of smart device 14 has failed and send a message indicative of the failure of the update to primary communication device 12.

In 68, primary communication device 12 sends a message to smart device 14 instructing smart device 14 to finish the update of the firmware/OS image. In 70, smart device 14 sends a request for the new update image to primary communication device 12. In 72, primary communication device 12 resumes the download of the update image to smart device 14. In a particular embodiment, the download of the update image resumes from the point that the update image that was last received. In still another embodiment, the entire update image may be downloaded to smart device 14. In 74, smart device 14 determines that the update image is complete. In 76, smart device 14 sets the image flag to On indicating that the current image stored within firmware/OS memory 22 is valid. In 78, smart device 14 sends an acknowledgment of the success of the update to primary communication device 12. In a particular embodiment, if primary communication device 12 fails to receive the acknowledgement of update success, primary communication device 12 may enter a mode to re-query smart device 14 for the version installed before attempting to go on to start the recovery process. In still another particular embodiment, if primary communication device 12 fails to receive the acknowledgement of update success primary communication device starts the update process again. In 80, smart device 14 reboots in the normal mode and uses the new updated firmware/OS image for operations in the normal mode.

Figure 6:
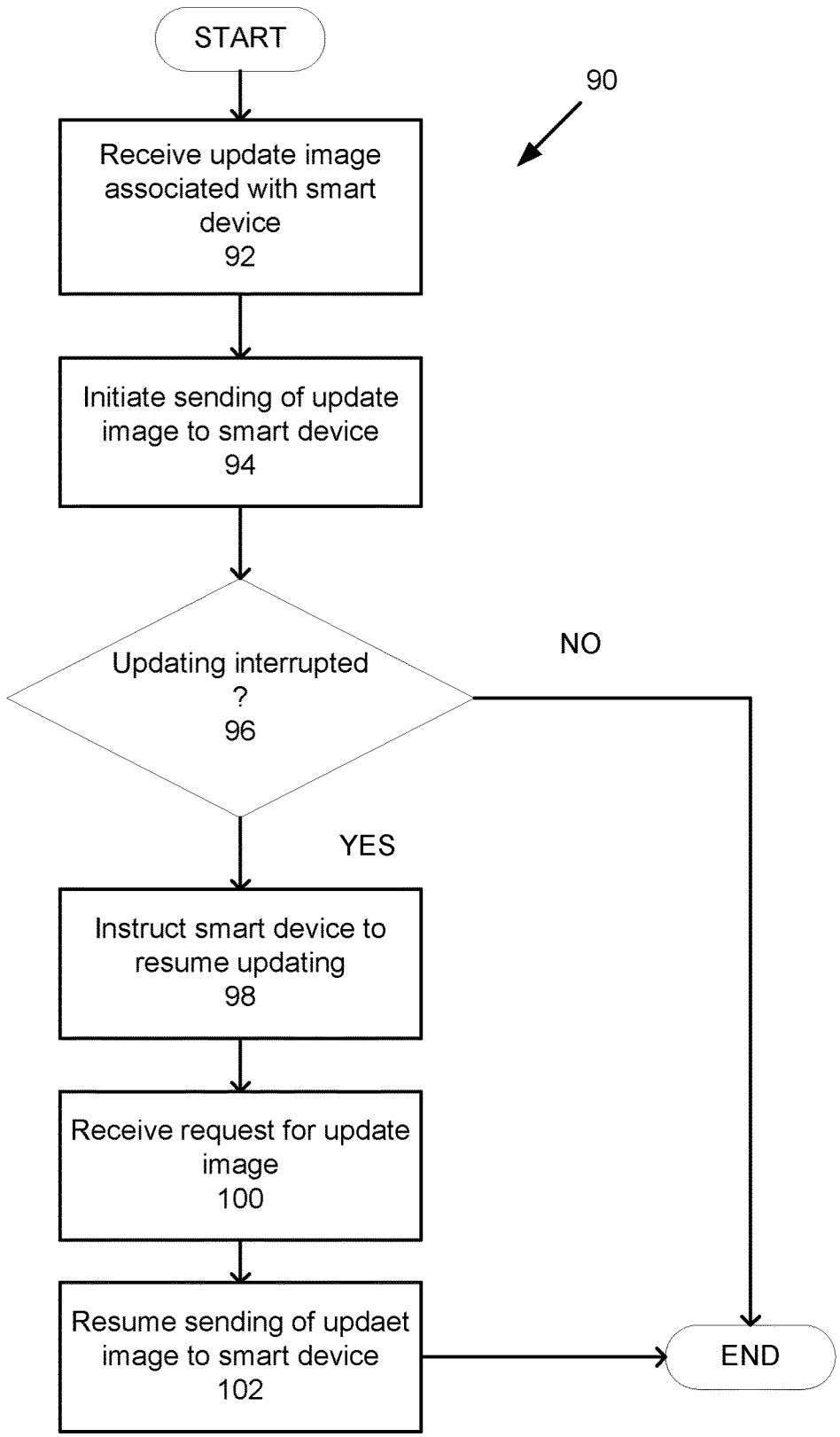
FIG. 6 illustrates a simplified flow chart showing operations associated with the primary communication device in accordance with one embodiment.

FIG. 6 illustrates a simplified flow chart 90 showing operations associated with primary communication device 12 in accordance with one embodiment. In 92, primary communication device receives an update image associated with 14 smart device. In 94, primary communication device initiates sending of the update image to smart device 14. The bootloader module 20 of the smart device is configured to update firmware/OS memory 22 of smart device 14 with the update image. In 96, primary communication device 12 determines whether the updating of the memory of the smart device with the update image has been interrupted. If the updating of update firmware/OS memory 22 of smart device 14 is determined to not be interrupted, the operations end.

If the updating of update firmware/OS memory 22 of smart device 14 is determined to be interrupted, the operations continue to 98. In 98, responsive to determining that the updating of firmware/OS memory 22 of smart device 14 with the update image has been interrupted, primary communication device 12 sends a first message to smart device 14 to instruct bootloader module 20 of smart device 14 to resume updating of firmware/OS memory 22 of smart device 14. In 100, primary communication device 12 receives a request for the update image from smart device 14 responsive to the sending of the first message. In 102, primary communication device 12 resumes sending of the update image to smart device 14 and the operations end.

In particular embodiments, the determining of whether the updating of firmware/OS memory 22 of smart device 14 with the update image has been interrupted includes determining that primary communication device 12 has not received a communication from smart device 14 within a predetermined time period. In still other embodiments, the determining of whether the updating of firmware/OS memory 22 of smart device 14 with the update image has been interrupted includes receiving a second message from smart device 14 indicative that the updating of firmware/OS memory 22 of smart device 14 with the update image has been interrupted. In still other embodiments, the determining of whether the updating of firmware/OS memory 22 of smart device 14 with the update image has been interrupted includes receiving a third message from network device 16 indicative that the updating of firmware/OS memory 22 of smart device 14 with the update image has been interrupted. In a particular embodiment, the update image includes a firmware update image. In still another embodiment, the update image includes an operating system update image. In another embodiment, primary communication device 12 includes a smartphone. In still other particular embodiments, primary communications device 12 can include a tablet computer, a laptop computer, a desktop computer, a smart watch, or any other suitable communication device. In still another embodiment, smart device 14 includes a wearable device.

In regards to the internal structure associated with communication system 10, each of primary communication device 12, smart device 14, and network device 16 can include memory elements for storing information to be used in the operations outlined herein. Each of primary communication device 12, smart device 14, and network device 16 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 10, such as primary communication device 12, smart device 14, and network device 16, may include software modules to achieve, or to foster, operations as outlined herein. These modules may be suitably combined in any appropriate manner, which may be based on particular configuration and/or provisioning needs. In certain embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of primary communication device 12, smart device 14, and network device 16 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

EXAMPLES

The following examples pertain to further embodiments.

Example 1 is an apparatus, comprising logic, at least partially incorporated into hardware, to: receive, by a primary communication device, an update image associated with a smart device; initiate sending of the update image to the smart device, wherein a bootloader of the smart device is configured to update a memory of the smart device with the update image; determine whether the updating of the memory of the smart device with the update image has been interrupted; and responsive to determining that the updating of the memory of the smart device with the update image has been interrupted, send a first message to the smart device to instruct the bootloader of the smart device to resume updating of the memory of the smart device.

In Example 2, the subject matter of Example 1 can optionally include wherein the determining of whether the updating of the memory of the smart device with the update image has been interrupted includes determining that the primary communication device has not received a communication from the smart device within a predetermined time period.

In Example 3, the subject matter of Example 1 can optionally include wherein the determining of whether the updating of the memory of the smart device with the update image has been interrupted includes receiving a second message from the smart device indicative that the updating of the memory of the smart device with the update image has been interrupted.

In Example 4, the subject matter of Example 1 can optionally include wherein the determining of whether the updating of the memory of the smart device with the update image has been interrupted includes receiving a third message from a network device indicative that the updating of the memory of the smart device with the update image has been interrupted.

In Example 5, the subject matter of Example 1 can optionally include wherein the logic is further to: receive a request for the update image from the smart device responsive to the sending of the first message; and resume sending of the update image to the smart device.

In Example 6, the subject matter of Example 1 can optionally include wherein the update image includes a firmware update image.

In Example 7, the subject matter of Example 1 can optionally include wherein the update image includes an operating system update image.

In Example 8, the subject matter of Example 1 can optionally include wherein the primary communication device includes one of a smartphone, a tablet computer, a laptop computer, a desktop computer, and a smart watch.

In Example 9, the subject matter of Example 1 can optionally include wherein the smart device includes a wearable device.

Example 10 is at least one non-transitory computer storage medium to store computer code comprising: computer code to receive, by a primary communication device, an update image associated with a smart device; computer code to initiate sending of the update image to the smart device, wherein a bootloader of the smart device is configured to update a memory of the smart device with the update image; computer code to determine whether the updating of the memory of the smart device with the update image has been interrupted; and responsive to determining that the updating of the memory of the smart device with the update image has been interrupted, computer code to send a first message to the smart device to instruct the bootloader of the smart device to resume updating of the memory of the smart device.

In Example 11, the subject matter of Example 10 can optionally include wherein the determining of whether the updating of the memory of the smart device with the update image has been interrupted includes determining that the primary communication device has not received a communication from the smart device within a predetermined time period.

In Example 12, the subject matter of Example 10 can optionally include wherein the determining of whether the updating of the memory of the smart device with the update image has been interrupted includes receiving a second message from the smart device indicative that the updating of the memory of the smart device with the update image has been interrupted.

In Example 13, the subject matter of Example 10 can optionally include wherein the determining of whether the updating of the memory of the smart device with the update image has been interrupted includes receiving a third message from a network device indicative that the updating of the memory of the smart device with the update image has been interrupted.

In Example 14, the subject matter of Example 10 can optionally include computer code to receive a request for the update image from the smart device responsive to the sending of the first message; and computer code to resume sending of the update image to the smart device.

In Example 15, the subject matter of Example 1 can optionally include wherein the update image includes a firmware update image.

In Example 16, the subject matter of Example 10 can optionally include wherein the update image includes an operating system update image.

Example 17 is a computer-implemented method comprising: receiving, by a primary communication device, an update image associated with a smart device; initiating sending of the update image to the smart device, wherein a bootloader of the smart device is configured to update a memory of the smart device with the update image; determining whether the updating of the memory of the smart device with the update image has been interrupted; and responsive to determining that the updating of the memory of the smart device with the update image has been interrupted, sending a first message to the smart device to instruct the bootloader of the smart device to resume updating of the memory of the smart device.

In Example 18, the subject matter of Example 1 can optionally include wherein the determining of whether the updating of the memory of the smart device with the update image has been interrupted includes determining that the primary communication device has not received a communication from the smart device within a predetermined time period.

In Example 19, the subject matter of Example 17 can optionally include wherein the determining of whether the updating of the memory of the smart device with the update image has been interrupted includes receiving a second message from the smart device indicative that the updating of the memory of the smart device with the update image has been interrupted.

In Example 20, the subject matter of Example 17 can optionally include wherein the determining of whether the updating of the memory of the smart device with the update image has been interrupted includes receiving a third message from a network device indicative that the updating of the memory of the smart device with the update image has been interrupted.

In Example 21, the subject matter of Example 17 can optionally include receiving a request for the update image from the smart device responsive to the sending of the first message; and resuming sending of the update image to the smart device.

Example 21 is an apparatus comprising: means for receiving, by a primary communication device, an update image associated with a smart device; means for initiating sending of the update image to the smart device, wherein a bootloader of the smart device is configured to update a memory of the smart device with the update image; means for determining whether the updating of the memory of the smart device with the update image has been interrupted; and responsive to determining that the updating of the memory of the smart device with the update image has been interrupted, means for sending a first message to the smart device to instruct the bootloader of the smart device to resume updating of the memory of the smart device.

In Example 23, the subject matter of Example 22 can optionally include wherein the determining of whether the updating of the memory of the smart device with the update image has been interrupted includes determining that the primary communication device has not received a communication from the smart device within a predetermined time period.

In Example 24, the subject matter of Example 22 can optionally include wherein the determining of whether the updating of the memory of the smart device with the update image has been interrupted includes receiving a second message from the smart device indicative that the updating of the memory of the smart device with the update image has been interrupted.

In Example 25, the subject matter of Example 22 can optionally include wherein the determining of whether the updating of the memory of the smart device with the update image has been interrupted includes receiving a third message from a network device indicative that the updating of the memory of the smart device with the update image has been interrupted.

In Example 26, the subject matter of Examples 22-23 can optionally include means for receiving a request for the update image from the smart device responsive to the sending of the first message; and means for resuming sending of the update image to the smart device.

In Example 27, the subject matter of Examples 22-23 can optionally include wherein the update image includes a firmware update image.

In Example 28, the subject matter of Examples 22-23 can optionally include wherein the update image includes an operating system update image.

Example 29 is an apparatus, comprising logic, at least partially incorporated into hardware, to: receive, by a primary communication device, an update image associated with a smart device; initiate sending of the update image to the smart device, wherein a bootloader of the smart device is configured to update a memory of the smart device with the update image; determine whether the updating of the memory of the smart device with the update image has been interrupted; and responsive to determining that the updating of the memory of the smart device with the update image has been interrupted, send a first message to the smart device to instruct the bootloader of the smart device to resume updating of the memory of the smart device.

In Example 30, the subject matter of Example 29 can optionally include wherein the determining of whether the updating of the memory of the smart device with the update image has been interrupted includes determining that the primary communication device has not received a communication from the smart device within a predetermined time period.

In Example 31, the subject matter of Example 29 can optionally include wherein the determining of whether the updating of the memory of the smart device with the update image has been interrupted includes receiving a second message from the smart device indicative that the updating of the memory of the smart device with the update image has been interrupted.

In Example 32, the subject matter of Example 29 can optionally include wherein the determining of whether the updating of the memory of the smart device with the update image has been interrupted includes receiving a third message from a network device indicative that the updating of the memory of the smart device with the update image has been interrupted.

In Example 33, the subject matter of Examples 29-30 can optionally include wherein the logic is further to: receive a request for the update image from the smart device responsive to the sending of the first message; and resume sending of the update image to the smart device.

In Example 34, the subject matter of Examples 29-30 can optionally include wherein the update image includes a firmware update image.

In Example 35, the subject matter of Examples 29-30 can optionally include wherein the update image includes an operating system update image.

In Example 36, the subject matter of Examples 29-30 can optionally include wherein the primary communication device includes one of a smartphone, a tablet computer, a laptop computer, a desktop computer, and a smart watch.

In Example 37, the subject matter of Examples 29-30 can optionally include wherein the smart device includes a wearable device.

Example 38 is at least one non-transitory computer storage medium to store computer code comprising: computer code to receive, by a primary communication device, an update image associated with a smart device; computer code to initiate sending of the update image to the smart device, wherein a bootloader of the smart device is configured to update a memory of the smart device with the update image; computer code to determine whether the updating of the memory of the smart device with the update image has been interrupted; and responsive to determining that the updating of the memory of the smart device with the update image has been interrupted, computer code to send a first message to the smart device to instruct the bootloader of the smart device to resume updating of the memory of the smart device.

In Example 39, the subject matter of Example 38 can optionally include wherein the determining of whether the updating of the memory of the smart device with the update image has been interrupted includes determining that the primary communication device has not received a communication from the smart device within a predetermined time period.

In Example 40, the subject matter of Example 38 can optionally include wherein the determining of whether the updating of the memory of the smart device with the update image has been interrupted includes receiving a second message from the smart device indicative that the updating of the memory of the smart device with the update image has been interrupted.

In Example 41, the subject matter of Example 38 can optionally include wherein the determining of whether the updating of the memory of the smart device with the update image has been interrupted includes receiving a third message from a network device indicative that the updating of the memory of the smart device with the update image has been interrupted.

In Example 42, the subject matter of Examples 38-39 can optionally include computer code to receive a request for the update image from the smart device responsive to the sending of the first message; and computer code to resume sending of the update image to the smart device.

In Example 43, the subject matter of Examples 38-39 can optionally include wherein the update image includes a firmware update image.

In Example 44, the subject matter of Examples 38-39 can optionally include wherein the update image includes an operating system update image.

Example 45 is a computer-implemented method comprising: receiving, by a primary communication device, an update image associated with a smart device; initiating sending of the update image to the smart device, wherein a bootloader of the smart device is configured to update a memory of the smart device with the update image; determining whether the updating of the memory of the smart device with the update image has been interrupted; and responsive to determining that the updating of the memory of the smart device with the update image has been interrupted, sending a first message to the smart device to instruct the bootloader of the smart device to resume updating of the memory of the smart device.

In Example 46, the subject matter of Example 45 can optionally include wherein the determining of whether the updating of the memory of the smart device with the update image has been interrupted includes determining that the primary communication device has not received a communication from the smart device within a predetermined time period.

In Example 47, the subject matter of Example 45 can optionally include wherein the determining of whether the updating of the memory of the smart device with the update image has been interrupted includes receiving a second message from the smart device indicative that the updating of the memory of the smart device with the update image has been interrupted.

In Example 48, the subject matter of Example 45 can optionally include wherein the determining of whether the updating of the memory of the smart device with the update image has been interrupted includes receiving a third message from a network device indicative that the updating of the memory of the smart device with the update image has been interrupted.

In Example 49, the subject matter of Examples 45-46 can optionally include receiving a request for the update image from the smart device responsive to the sending of the first message; and resuming sending of the update image to the smart device.

Example 50 is a method comprising: receiving, by a primary communication device, an update image associated with a smart device; initiating sending of the update image to the smart device, wherein a bootloader of the smart device is configured to update a memory of the smart device with the update image; determining whether the updating of the memory of the smart device with the update image has been interrupted; and responsive to determining that the updating of the memory of the smart device with the update image has been interrupted, sending a first message to the smart device to instruct the bootloader of the smart device to resume updating of the memory of the smart device.

In Example 51, the subject matter of Example 51 can optionally include, wherein the determining of whether the updating of the memory of the smart device with the update image has been interrupted includes determining that the primary communication device has not received a communication from the smart device within a predetermined time period.

In Example 52, the subject matter of Example 50 can optionally include wherein the determining of whether the updating of the memory of the smart device with the update image has been interrupted includes receiving a second message from the smart device indicative that the updating of the memory of the smart device with the update image has been interrupted.

In Example 53, the subject matter of Example 50 can optionally include wherein the determining of whether the updating of the memory of the smart device with the update image has been interrupted includes receiving a third message from a network device indicative that the updating of the memory of the smart device with the update image has been interrupted.

In Example 54, the subject matter of Examples 50-51 can optionally include receiving a request for the update image from the smart device responsive to the sending of the first message; and resuming sending of the update image to the smart device.

In Example 55, the subject matter of Examples 50-51 can optionally include wherein the update image includes a firmware update image.

In Example 56, the subject matter of Examples 50-51 can optionally include wherein the update image includes an operating system update image.

In Example 57, the subject matter of Examples 50-51 can optionally include wherein the primary communication device includes one of a smartphone, a tablet computer, a laptop computer, a desktop computer, and a smart watch.

In Example 58, the subject matter of Examples 50-51 can optionally include wherein the smart device includes a wearable device.

Example 59 is an apparatus comprising means for performing the method of any of the preceding examples.

In Example 60, the subject matter of Example 59 can optionally include wherein the means for performing the method comprise a processor and a memory.

In Example 61, the subject matter of Example 60 can optionally include wherein the memory comprises machine-readable instructions, that when executed cause the apparatus to perform the method of any of Examples 50-58.

In Example 62, the subject matter of any of Examples 59-61 can optionally include wherein the apparatus is a computing system.

Example 63 is at least one computer readable medium comprising instructions that, when executed, implement a method or realize an apparatus as claimed in any preceding Example.

What is claimed is:

1. An apparatus, comprising logic, at least partially incorporated into hardware, to:
   receive, by a primary communication device, an update system image associated with a smart device;
   initiate sending of the update system image to the smart device, wherein a bootloader of the smart device is configured to update a memory of the smart device with the update system image;
   determine whether the updating of the memory of the smart device with the update system image has been interrupted, wherein the determination is made prior to an update completion and without a user acting as arbiter; and
   responsive to determining that the updating of the memory of the smart device with the update system image has been interrupted, send a first message to the smart device to instruct the bootloader of the smart device to resume updating of the memory of the smart device
   wherein, the smart device includes enough memory to store one copy of an applicable operating system or firmware.

2. The apparatus of claim 1, wherein the determining of whether the updating of the memory of the smart device with the update image has been interrupted includes determining that the primary communication device has not received a communication from the smart device within a predetermined time period.

3. The apparatus of claim 1, wherein the determining of whether the updating of the memory of the smart device with the update system image has been interrupted includes receiving a second message from the smart device indicative that the updating of the memory of the smart device with the update system image has been interrupted.

4. The apparatus of claim 1, wherein the determining of whether the updating of the memory of the smart device with the update system image has been interrupted includes receiving a third message from a network device indicative that the updating of the memory of the smart device with the update system image has been interrupted.

5. The apparatus of claim 1, the logic further to:
   receive a request for the update system image from the smart device responsive to the sending of the first message; and
   resume sending of the update system image to the smart device.

6. The apparatus of claim 1, wherein the update system image includes a firmware update image.

7. The apparatus of claim 1, wherein the determination is made by at least one of primary communication device, smart device and a server.

8. The apparatus of claim 1, wherein the primary communication device includes one of a smartphone, a tablet computer, a laptop computer, a desktop computer, and a smart watch.

9. The apparatus of claim 1, wherein the smart device includes a wearable device.

10. At least one non-transitory computer storage medium to store computer code comprising:
    computer code to receive, by a primary communication device, an update system image associated with a smart device;
    computer code to initiate sending of the update system image to the smart device, wherein a bootloader of the smart device is configured to update a memory of the smart device with the update system image;
    computer code to determine whether the updating of the memory of the smart device with the update system image has been interrupted, wherein the determination is made prior to an update completion and without a user acting as arbiter; and
    responsive to determining that the updating of the memory of the smart device with the update image has been interrupted, computer code to send a first message to the smart device to instruct the bootloader of the smart device to resume updating of the memory of the smart device
    wherein, the smart device includes enough memory to store one copy of an applicable operating system or firmware.

11. The at least one non-transitory computer storage medium of claim 10, wherein the determining of whether the updating of the memory of the smart device with the update image has been interrupted includes determining that the primary communication device has not received a communication from the smart device within a predetermined time period.

12. The at least one non-transitory computer storage medium of claim 10, wherein the determining of whether the updating of the memory of the smart device with the update system image has been interrupted includes receiving a second message from the smart device indicative that the updating of the memory of the smart device with the update system image has been interrupted.

13. The at least one non-transitory computer storage medium of claim 10, wherein the determining of whether the updating of the memory of the smart device with the update image has been interrupted includes receiving a third message from a network device indicative that the updating of the memory of the smart device with the update system image has been interrupted.

14. The at least one non-transitory computer storage medium of claim 10, further comprising:
    computer code to receive a request for the update system image from the smart device responsive to the sending of the first message; and
    computer code to resume sending of the update system image to the smart device.

15. The at least one non-transitory computer storage medium of claim 10, wherein the update system image includes a firmware update image.

16. The at least one non-transitory computer storage medium of claim 10, wherein the update system image includes an operating system update image.

17. A computer-implemented method comprising:
    receiving, by a primary communication device, an update system image associated with a smart device;
    initiating sending of the update image to the smart device, wherein a bootloader of the smart device is configured to update a memory of the smart device with the update system image;
    determining whether the updating of the memory of the smart device with the update system image has been interrupted, wherein the determination is made prior to an update completion and without a user acting as arbiter; and
    responsive to determining that the updating of the memory of the smart device with the update system image has been interrupted, sending a first message to the smart device to instruct the bootloader of the smart device to resume updating of the memory of the smart device
    wherein, the smart device includes enough memory to store one copy of an applicable operating system or firmware.

18. The computer-implemented method of claim 17, wherein the determining of whether the updating of the memory of the smart device with the update system image has been interrupted includes determining that the primary communication device has not received a communication from the smart device within a predetermined time period.

19. The computer-implemented method of claim 17, wherein the determining of whether the updating of the memory of the smart device with the update system image has been interrupted includes receiving a second message from the smart device indicative that the updating of the memory of the smart device with the update system image has been interrupted.

20. The computer-implemented method of claim 17, wherein the determining of whether the updating of the memory of the smart device with the update system image has been interrupted includes receiving a third message from a network device indicative that the updating of the memory of the smart device with the update system image has been interrupted.

21. The computer-implemented method of claim 17, further comprising:
    receiving a request for the update system image from the smart device responsive to the sending of the first message; and
    resuming sending of the update system image to the smart device.

* * * * *